United States Patent [19]
Suzuki

[11] Patent Number: 5,392,174
[45] Date of Patent: Feb. 21, 1995

[54] METHOD AND APPARATUS FOR CONTROLLING THE SPEED OF MOVEMENT OF THE HEAD OF A DISK DRIVE APPARATUS TO A TARGET TRACK

[75] Inventor: Yasuaki Suzuki, Kanagawa, Japan

[73] Assignee: Sony Corporation, Tokyo, Japan

[21] Appl. No.: 705,598

[22] Filed: May 24, 1991

[30] Foreign Application Priority Data

May 29, 1990 [JP] Japan .................................. 2-138688

[51] Int. Cl.⁶ .............................................. G11B 5/596
[52] U.S. Cl. .............................. 360/78.06; 360/78.07; 360/78.04
[58] Field of Search ............... 360/78.06, 78.04, 78.05, 360/77.02, 78.07, 78.08; 369/32, 44.28; 318/561

[56] References Cited

U.S. PATENT DOCUMENTS

| | | | |
|---|---|---|---|
| 4,931,889 | 2/1990 | Osafume | 360/78.07 |
| 4,937,689 | 6/1990 | Seaver et al. | 360/78.01 X |
| 5,021,898 | 6/1991 | Sakai et al. | 360/78.04 |
| 5,065,382 | 11/1991 | Seko et al. | 360/77.08 |

*Primary Examiner*—Aristotelis Psitos
*Assistant Examiner*—Varsha A. Rapadir
*Attorney, Agent, or Firm*—William S. Frommer; Alvin Sinderbrand

[57] ABSTRACT

A method for controlling a speed at which a head of a disk drive apparatus is moved toward a target track of a plurality of tracks disposed on a disk shaped recording medium, comprising the steps of, reproducing a signal recorded on the medium and detecting a current position of the head by using the reproduced signal, obtaining the distance between the current position of the head and the position of the target track, dividing a speed profile representing head speed relative to distance of the head to the target track into a plurality of distance ranges, generating a speed profiled in a range in accordance with the distance to the target track by using an approximation calculation, and controlling a speed of the head toward the target track in accordance with the speed profile.

4 Claims, 6 Drawing Sheets

METHOD AND APPARATUS FOR CONTROLLING THE SPEED OF MOVEMENT OF THE HEAD OF A DISK DRIVE APPARATUS TO A TARGET TRACK

BACKGROUND OF INVENTION

1. Field of the Invention

The present invention relates to a method and apparatus for controlling the motion of a head relative to a magnetic or other disk shaped recording medium.

2. Description of the Prior Art

A head such as a magnetic head or an optical pickup is moved toward a target track of a disk shaped recording medium such as a magnetic disk or an optical disk so as to position the head on the target tack. When the head is moved, the speed of the head is controlled in accordance with a speed profile (speed reference) until it approaches the target track. When the head approaches the target track, it is positioned on the target track by means of a position control. The speed profile which refers to the basis of the speed control is determined by a distance x between the present position of the head and the position of the target track.

For example, in the case of a uniform deceleration, the following equations can be satisfied.

$$v = at$$

$$x = \tfrac{1}{2} at^2$$

where v: speed, a: deceleration, t: time, x: distance. Thus, when t is removed from the above equations, the speed profile, which is the function representing the relationship between the speed v and the distance x, can be expressed as $(v = \sqrt{2ax})$.

Since it is difficult to obtain the above mentioned speed profile by software calculations, conventionally it is stored as a table in memory. Depending on the distance x, the speed v is read from the memory. When data is discretely input as for a sector servo, the unit of the data in the table is the distance moved at sampling intervals. In the case where pulses representing motion through the centers of tracks are counted, the unit of the data is one track.

Recently, in order to increase the storage capacity of the disk, the pitches of the tracks therein are made narrow. For example, in a 3.5 inch hard disk, the number of tracks exceeds 1500. Thus, it is expected that the TPI (tracks per inch) will increase.

When the speed profile table has a track unit resolution, it is necessary to provide data for each of a large number of tracks thereby increasing the required memory capacity for storing the table.

On the other hand, when the head speed becomes fast, a speed profile with much higher accuracy than the above mentioned method is required. Thus, in the vicinity of the target track, the speed should be controlled with a resolution of for example ½ of a track. However, when the resolution is increased, the required memory capacity of the data table for the speed profile is further increased.

OBJECTS AND SUMMARY OF THE INVENTION

Therefore, an object of the present invention is to solve the above mentioned problem and to provide a drive apparatus for a disk shaped recording medium which stores all speed profile data in memory.

According to a first aspect of the invention, a method for controlling the motion of a head of a disk drive apparatus to a target track of a plurality of tracks disposed on a disk shaped recording medium, comprises the steps of, reproducing a signal recorded on the disk and detecting a current position of the head by using the reproduced signal, obtaining the distance between the current position of the head and the position of the target track, dividing a speed profile representing a head moving speed determined in accordance with the distance to the target track into a plurality of ranges in accordance with the distance to the target track and generating a speed profile in a respective range in accordance with the distance to the target track by using an approximation calculation, and controlling a speed of movement of the head in accordance with the speed profile.

According to a second aspect of the invention, there is provided a disk drive for moving a head to a target track of a plurality of tracks disposed on a disk shaped recording medium and for recording and reproducing data to and from the target track, comprising, head position detection means for reproducing a track information signal recorded on the disk and for detecting the head position, distance detection means for obtaining the distance between the position of the target track and the head position obtained by the head position detection means, range selection means for dividing a speed profile representing the head speed in accordance with the distance for which the head is moved into a plurality of ranges in accordance with the distance and for selecting one of the plurality of ranges which accords with the distance to the target track obtained by the distance detection means, speed profile generation means for generating a speed profile in the range selected by the range detection means by using an approximation calculation, and head moving means for moving the head toward the target track in accordance with the speed profile generated by the speed profile generation means.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Now, with reference to the accompanying drawings, an embodiment of the present invention will be described. The embodiment will be described in the following order.

a. Disk drive apparatus
b. Speed profile generation block
c. Construction of servo zone
d. Forming fine information
e. Forming address information a. Disk drive apparatus

Figure 1:
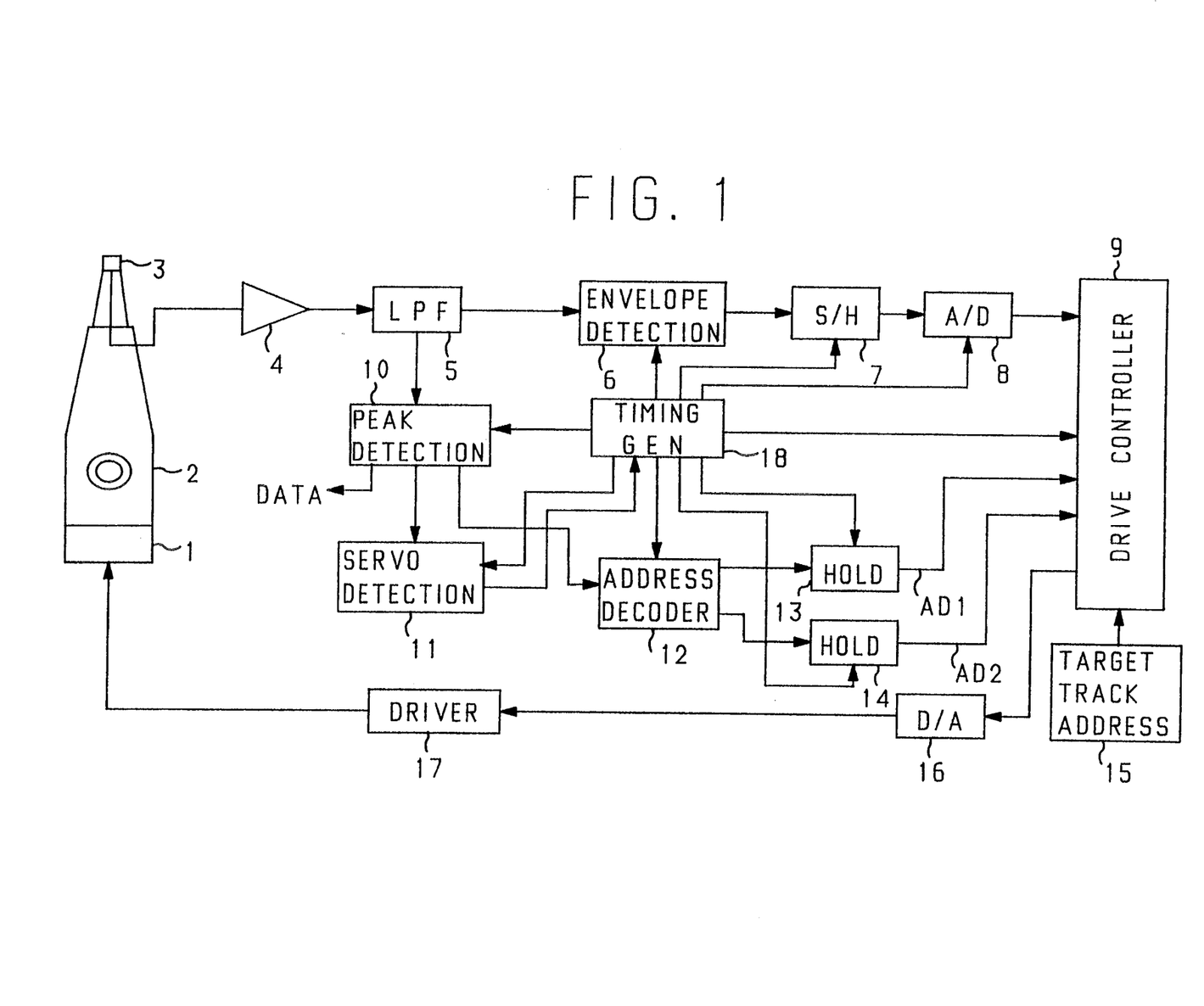
FIG. 1 is a block diagram of a disk drive apparatus for reproducing data on a magnetic disk according to the present invention.

FIG. 1 is a schematic diagram showing a construction of a disk drive in accordance with an embodiment of the present invention. In FIG. 1, reference numeral 1 is an actuator, for example, a voice coil motor. The voice coil motor 1 moves a magnetic head 3 disposed at an end of an arm 2 along the radial direction of a magnetic disk (not shown in the figure). A reproduction output of the magnetic head 3 is provided to a low pass filter 5 through a head amplifier 4. The low pass filter 5 separates a reproduction signal at a particular frequency from the reproduction output. The reproduction signal is provided to an envelope detection circuit 6. The output signal of the envelope detection circuit 6 is provided to a sample and hold circuit 7. A sampling pulse in a different phase from a timing generation circuit 18 is provided to the sample and hold circuit 7. This sampling pulse causes reproduction outputs in a position detection area and in a level detection area of a servo zone of the magnetic disk to be separately obtained. An output signal of the sample and hold circuit 7 is provided to an A/D converter 8. Digital data according to the level of the reproduction output in each area is provided from the A/D converter 8 to a drive controller 9.

A reproduction signal which is not processed by the low pass filter 5 is provided to a peak detection circuit 10 wherein the waveform of the reproduction signal is trimmed. Reproduction data which is read from the data area of a track is obtained from the peak detection circuit 10. An output signal of the peak detection circuit 10 is sent to a servo zone detection circuit 11 wherein a servo header recorded at the beginning of the servo zone is detected. A servo header detection signal is sent to the timing generation circuit 18 wherein a timing signal in synchronization with the reproduction signal is formed. In other words, a timing signal for the envelope detection circuit 6, a sampling pulse for the sample and hold circuit 7, a clock for the A/D converter 8, a clock for the drive controller 9, an AGC switching signal for the peak detection circuit 10, a timing signal for the servo zone detection circuit 11, and timing signals for an address decoder 12 and a pair of hold circuits 13 and 14, which will be described later, are generated by the timing generation circuit 18. An AGC circuit in the peak detection circuit 10 is controlled with the AGC switching signal so that the AGC operation is turned off in the servo zone.

An output signal of the peak detection circuit 10 is sent to the address decoder 12. The address decoder 12 decodes address information stored in the servo zone. The address information is composed of two addresses AD1 and AD2, which will be further described later. The address AD1 from the address decoder 12 is provided to the hold circuit 13. The address AD2 is provided to the hold circuit 14. The hold circuits 13 and 14 hold current address values until they are changed. The addresses AD1 and AD2 held by the hold circuits 13 and 14 are sent to the drive controller 9.

The drive controller 9 is composed of, for example, a micro computer and a digital circuit. When a seek operation is executed, a host processor (not shown in the figure) sends a target track address 15 to the drive controller 9. The drive controller 9 sends a drive signal, which will be described later, to a D/A converter 16. An analog drive signal from the D/A converter 16 is sent to the voice coil motor 1 through a driver 17.

Figure 2:
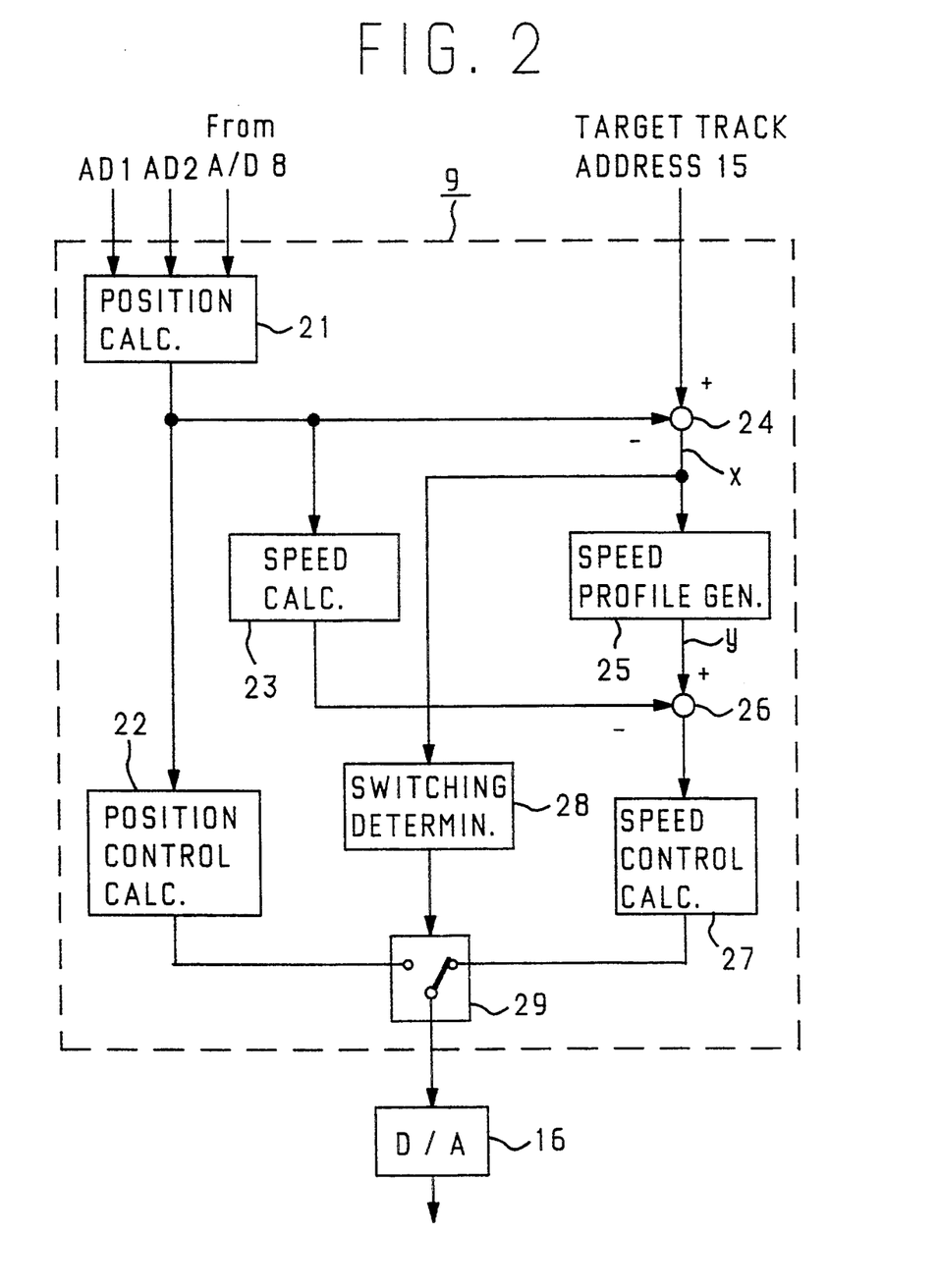
FIG. 2 is a block diagram of a drive controller of the disk drive apparatus of FIG. 1.

FIG. 2 is a block diagram showing a drive signal generating operation executed by software and hardware of the drive controller 9. The addresses AD1 and AD2, which are provided from the hold circuits 13 and 14, respectively, and the output signal from the A/D converter 8, are received by a position calculation block 21. The position calculation block 21 processes the reproduction signal in the position detection area so as to calculate fine information. In addition, the position calculation block 21 obtains address information in accordance with the addresses AD1 and AD2 and the reproduction output in the level detection area. In addition, by adding the address information and the fine information, position information representing the position of the magnetic head 3 is calculated.

The position information from the position calculation block 21 is provided to a position control calculation block 22, a speed calculation block 23, and a subtracter 24. The position control calculation block 22 generates a control signal for positioning the magnetic head 3 which is in the vicinity of the target track right on the target track. The speed calculation block 23 differentiates the position information, thereby generating a speed signal. The subtracter 24 obtains a difference x between the position of the target track address 15 and the current position of the magnetic head 3 represented by the position information. An output x from the subtracter 24 is provided to a speed profile generation block 25 and a switching determination block 28.

As will be described later, the speed profile generation block 25 outputs a speed y of the magnetic head 3 in accordance with the distance x between the current position of the magnetic head 3 and the position of the target track, the distance x being represented with the output from the subtracter 24. When the above mentioned distance x is large, the magnetic head 3 is moved at a maximum speed. In contrast, when the distance x becomes small, the magnetic head 3 is decelerated. The speed determined by the speed profile generation block 25 and the current speed from the speed calculation block 23 are sent to a subtracter 26. The subtracter 26 outputs a difference component between the above mentioned speeds. The difference component is provided to a speed control calculation block 27. The speed control calculation block 27 calculates a speed control signal so that the actual speed of the magnetic head 3 accords with the speed y of the speed profile.

The speed control signal from the speed control calculation block 27 and the position control signal from the position control calculation block 22 are provided to a selector 29. The selector 29 is controlled by the switching determination block 28. The switching determination block 28 generates a control signal for controlling the selector 29 by using the output signal from the subtracter 24. In other words, when the distance between the magnetic head 3 and the target track is large, the selector 29 selects the speed control signal. In contrast, when the magnetic head 3 is very close to the target track, the selector 29 selects the position control signal. A signal selected by the selector 29 is output from the drive controller 9 to the D/A converter 16.

b. Speed profile generation block

Figure 3:
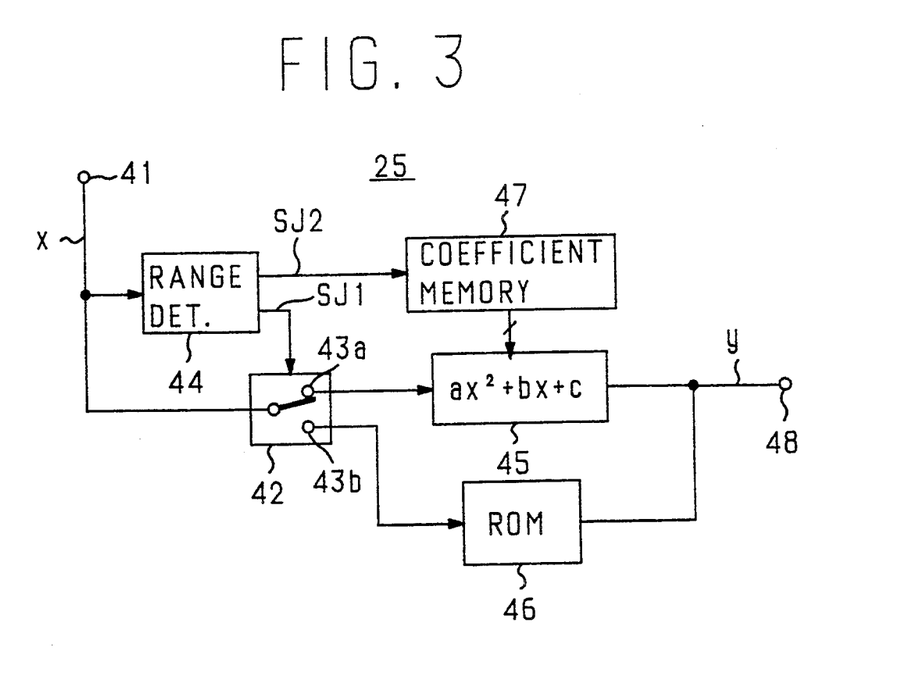
FIG. 3 is a block diagram showing an example of a speed profile generation block provided in the drive controller of FIG. 2.

FIG. 3 is a schematic diagram showing an example of a speed profile generation block 25. In FIG. 3, the output data x from the subtracter 24 is sent to an input terminal 41. The data x represents a difference x between the position of the target track and the current position of the magnetic head 3. The unit of the data x accords with the resolution provided by the addresses, for example, 1 track, $\frac{1}{2}$ track, $\frac{1}{4}$ track, and so forth. The data x is sent to an input terminal of a switching circuit 42 and a range detection circuit 44. One output terminal 43a of the switching circuit 42 is connected to an input terminal of a calculation circuit 45. The other output terminal 43b is connected to a ROM 46. The switching circuit 42 is controlled with a detection signal SJ1 from the range detection circuit 44. A detection signal SJ2 from the range detection circuit 44 is sent to a coefficient memory 47 as an address signal. An output signal of the calculation circuit 45 is connected with that of the ROM 46 and thereby the speed data y of the speed profile is output to an output terminal 48.

The operations of the above mentioned speed profile generation block 25 are accomplished by software except for the digital circuit and the ROM 46.

Figure 4:
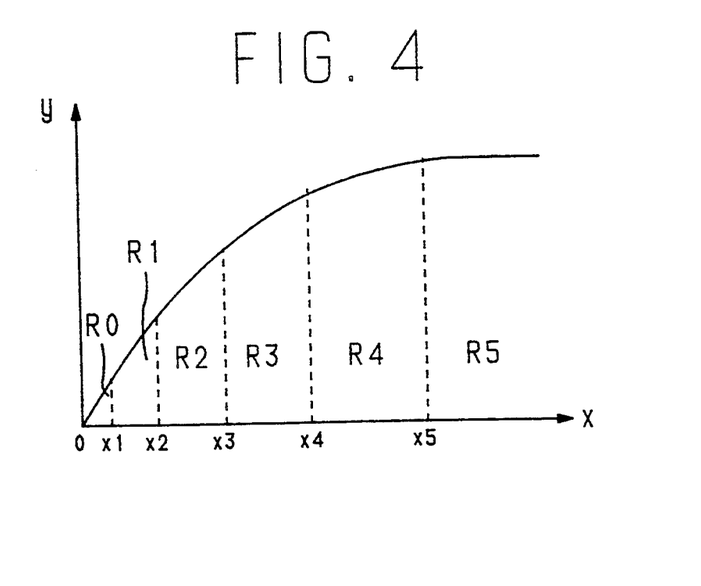
FIG. 4 is a diagram showing an example of a speed profile.

As shown in FIG. 4, in the present embodiment, the speed profile is divided into six ranges from R0 to R5. The ranges R0 to R5 are determined in accordance with the data x, which is the difference between the position of the target track and the present position of the magnetic head 3. In other words, the range of ($0 \leq x < x1$) is the range R0;
the range of ($x1 \leq x < x2$) is the range R1;
the range of ($x2 \leq x < x3$) is the range R2;
the range of ($x3 \leq x < x4$) is the range R3;
the range of ($x4 \leq x < x5$) is the range R4; and
the range of ($x5 \leq x$) is the range R5.

The closer the magnetic head is to the target track, the greater is the required accuracy. Thus, the range R0 is the narrowest, followed by the ranges R1, R2, R3, and R4. In the range R5, the speed of the magnetic head 3 is a maximum.

The detection signal SJ1 of the range detection circuit 44 indicates whether the speed y corresponding to the value x is in the range R0 or one of the ranges R1 to R5. When the speed y is in one of the ranges R1 to R5, the output terminal 43a of the switching circuit 42 is selected. When the speed y is in the range R0, the output terminal 43b of the switching circuit 42 is selected.

The other detection signal SJ2 from the range detection circuit 44 indicates the appropriate one of the ranges R1 to R5 for generating the speed y. The detection signal SJ2 causes coefficient ai, bi, and ci necessary for calculating the speed y in the range Ri (where i=1, 2, 3, 4, and 5) to be read from the coefficient memory 47. The coefficients are provided to the calculation circuit 45. The coefficients ai, bi, and ci have been predetermined by means of the method of least squares so as to approximate an ideal speed profile curve with only a small error. The calculation circuit 45 generates the speed y in the range Ri with the following quadratic equation:

$$y = a_i x^2 + b_i x + c_i$$

In the case of the range R5, ai and bi become 0 and thereby the speed y is equal to the constant ci. Besides the above mentioned quadratic equation, a linear expression and the like can be used.

In addition, the speed y in the range R0 may be generated in the calculation circuit 45. In the present invention, the speed y in the range R0 is generated by the ROM 46 so as to improve the accuracy of the speed control in the vicinity of the target track, which is most important in the tracking control. In this case, the speed y in the range R1 may also be generated by the ROM 46. The allowable approximation error depends on the accuracy in controlling acceleration and the actual speed of the magnetic head 3 when the speed control is switched to position control.

c. Construction of servo zone

On the magnetic disk, a large number of tracks are disposed in the shapes of concentric circles or in a spiral shape. Each track is divided into a particular number of sectors. Each sector has a servo zone pre-recorded thereon for detecting its position. The servo zone is not always disposed at each sector. Rather, it is possible to dispose the servo zone at intervals of a plurality of sectors. As another method, a plurality of servo zones may be disposed at each sector.

Figure 5:
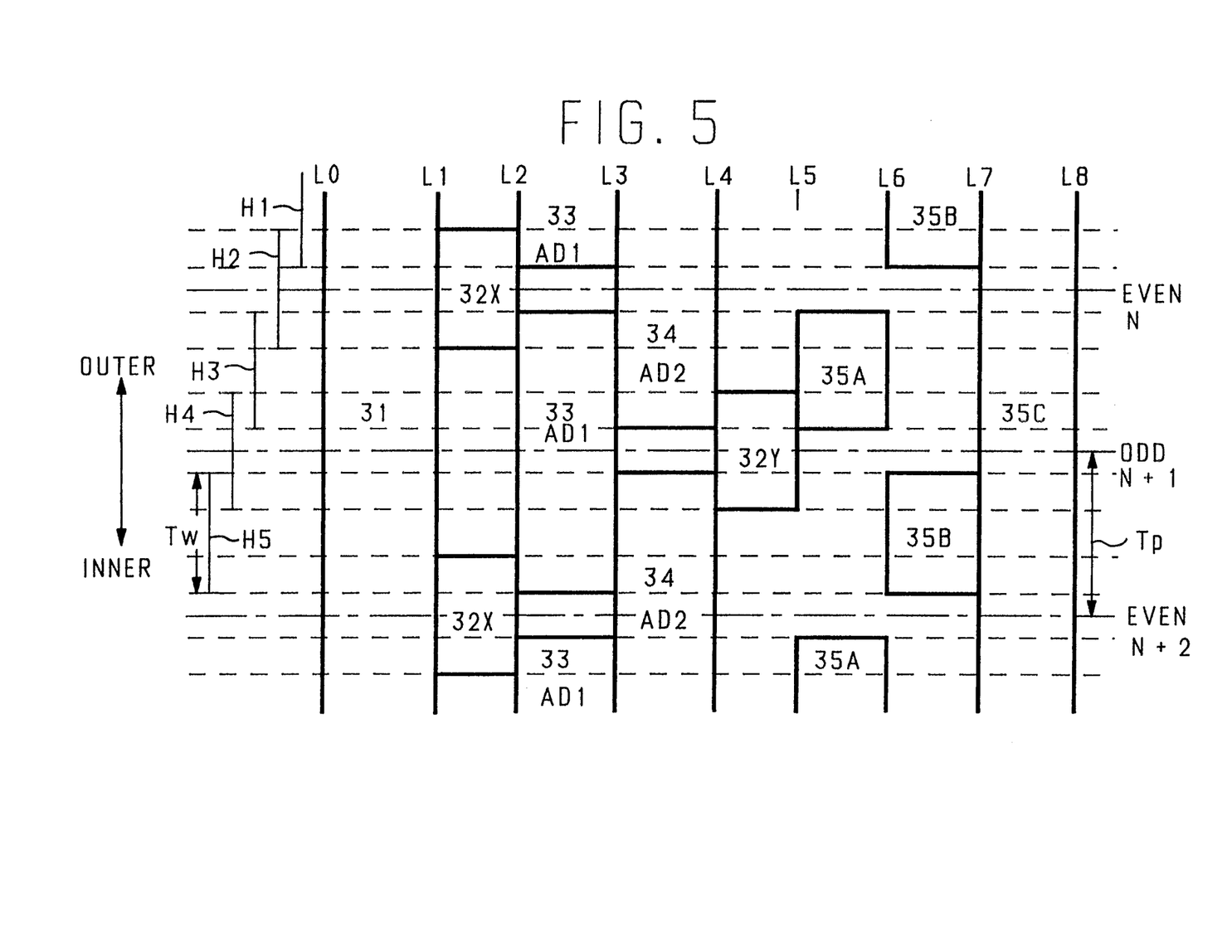
FIG. 5 is a diagram showing a construction of a servo zone of a disk shaped recording medium according to the present invention.

FIG. 5 is a schematic diagram showing a construction of a servo zone of the present embodiment. The center of each track is represented with a one-dot line. The addresses of tracks are allocated for example outwardly in the ascending order of N, N+1, N+2, . . . , and so forth. While N, N+2, . . . , and so forth are even addresses, N−1, N+1, . . . , and so forth are odd addresses. The relationship between a track width Tw of the magnetic head 3 and a track pitch Tp is (Tp>Tw). In a seek operation, the magnetic head 3 scans the disk in the order of H1, H2, H3, H4, H5, . . . , and so forth shown in FIG. 5.

The servo zone starts with the position L0 in the track direction. A servo header 31 is recorded between the positions L0 and L1. A digital signal recorded in the servo header 31 is a bit pattern code signal distinct from digital data which is recorded in a data area. The servo header is detected by the servo zone detection circuit 11 as the beginning of the servo zone.

A first level detection area 32x whose center accords with the track center of an even numbered address and whose width is the same as the track width Tw of the magnetic head is recorded between the positions L1 and L2. A first address area 33 whose width ranges from the track center of an odd numbered address to the vicinity of the track center of the subsequent even numbered address and which records the first address AD1 is disposed between the positions L2 and L3. A second address area 34 whose width ranges from the track center of an even numbered address to the vicinity of the track center of the subsequent odd numbered address and which records the second address AD2 is disposed between the positions L3 and L4. Thus, the addresses AD1 and AD2 have a phase difference of one track pitch Tp in the radial direction of the disk. A second level detection area 32Y whose track center accords with the track center of an odd numbered address and whose width is the same as the track width Tw of the magnetic head 3 is recorded between the positions L4 and L5. In the areas 32X and 32Y, pulse signals at a particular frequency have been recorded.

The envelopes of signals reproduced from the areas 32X and 32Y are detected by the envelope detection circuit 6. The signal envelopes are provided to the sample and hold circuit 7 wherein the envelope values of the signals reproduced from the areas 32X and 32Y are sampled. The sampled outputs are converted into digital data by the A/D converter 8. The addresses AD1 and AD2 are decoded by the address decoder 12. The hold circuits 13 and 14 hold addresses which are discretely obtained.

A pattern for obtaining the fine information is recorded between the positions L5 and L8, which is the last position in the servo zone. A first position detection area 35A is recorded between the positions L5 and L6. The first position detection area 35A is disposed between the inner peripheral side of the track center of an even numbered address and the outer peripheral side of the track center of the subsequent odd numbered address. A second position detection area 35B is disposed between the positions L6 and L7. The second position detection area 35B is disposed between the inner peripheral side of the track center of an odd numbered address and the outer peripheral side of the track center of the subsequent even numbered address.

In addition, a third position detection area 35C is disposed in a stripe shape between the positions L7 and L8, preceded by the areas 35a and 35B. The area 35C is continuously disposed in successive tracks without interposing no-record areas. In the areas 35A, 35B and 35C, pulse signals of a particular given frequency have been recorded.

The servo zone shown in FIG. 5 has been pre-recorded on the magnetic disk. As a pre-recording method, a clock signal track is disposed on the outermost periphery of the magnetic disk, the track recording a clock signal at a particular frequency. The signal in this track is reproduced by a fixed head. The signal in the servo zone is recorded in synchronization with the reproduced clock. In addition, by using a pulse signal which is synchronized with the clock, the level detection areas 32X and 32Y and the position detection areas 35A, 35B, and 35C can be positioned. The area 35C is recorded by the magnetic head 3 which radially moves for a smaller distance than the track width. In this case, the phase of the signal which has been recorded is the same as that of the signal being overwritten. Due to this, it is possible to prevent the level of the signal which is reproduced from the area 35C from dropping.

d. Forming fine information

The reproduction signals in the position detection areas 35A, 35B, and 35C are converted into digital values in accordance with their levels by the sample and hold circuit 7 and the A/D converter 8. The digital values are sent to the drive controller 9. The position calculation block 21 of the drive controller 9 generates fine information SF by using the output of the A/D converter 8.

Figures 6A, 6B:
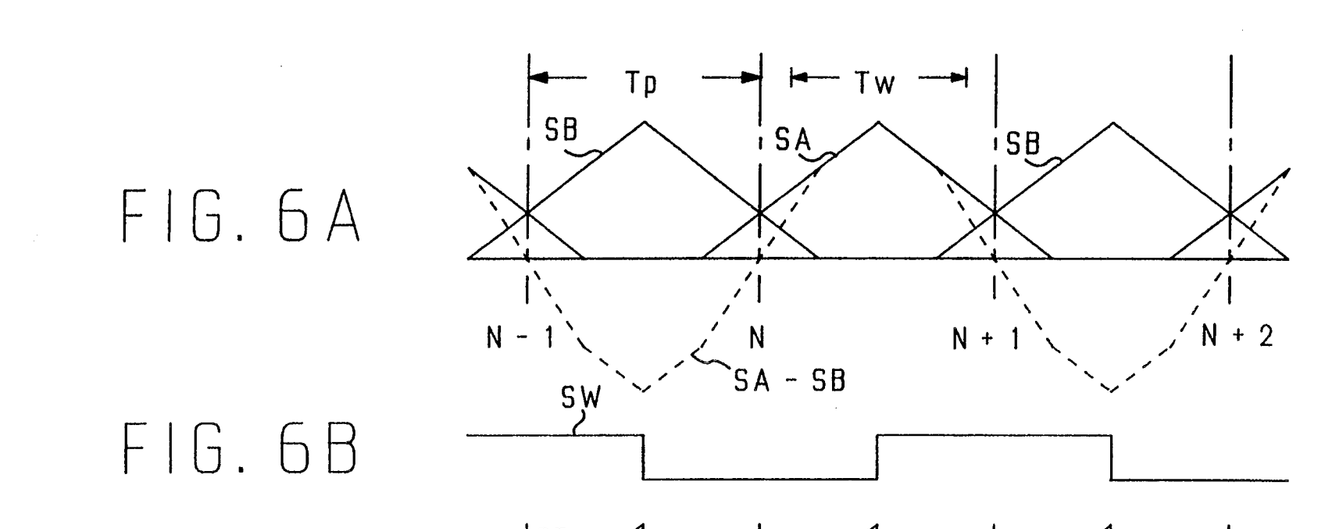
FIGS. 6A—6C are diagrams used in describing the formation of fine information.
Figure 6C:
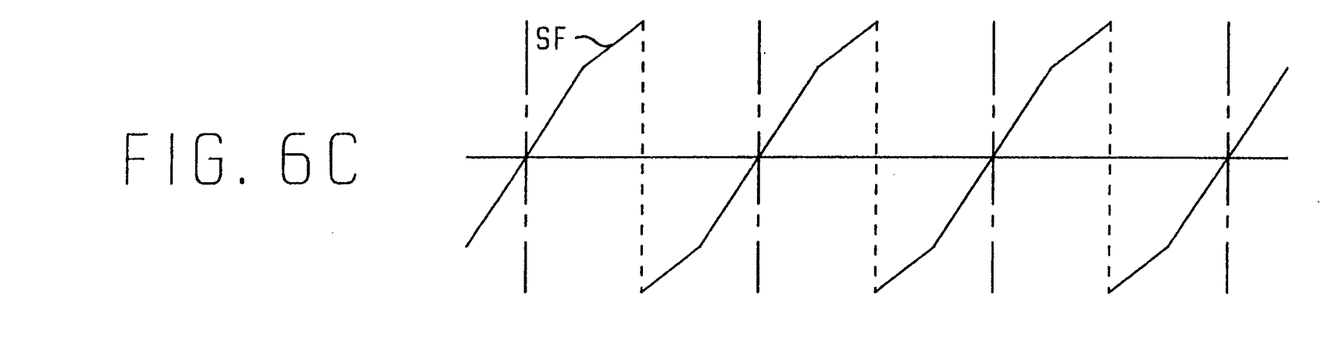

Now, assume that the level of the reproduction output from the area 35A is SA; the level of the reproduction output from the area 35B is SB; and the level of the reproduction output from the area 35C is SC. When the track width Tw of the magnetic head 3 is $\frac{3}{4}$ of the track pitch Tp, SA and SB which vary as shown in FIG. 6A are obtained. Thus, when the track center accords with the center of the magnetic head 3, the difference (SA−SB) represented with dot lines shown in FIG. 6A becomes 0. The difference is represented as a triangular wave. The polarity of the difference component is switched by a polarity determination signal SW shown in FIG. 6B and thereby fine information SF in a saw tooth shape is generated. In other words, when the polarity determination signal SW goes high, the difference component is reversed. In contrast, when the signal goes low, the difference component is not reversed. By such polarity reversing and normalization process, the fine information SF shown in FIG. 6C is generated. The polarity determination signal SW is generated in accordance with the clock which is synchronized with the reproduction signal. However, as will be described later, it is preferable to switch the polarity in accordance with the reproduction outputs of the level detection areas 32X and 32Y.

To normalize the difference component, the level SC, which is the reproduction output of the area 35C, is used. In other words, normalization is executed by a division of [(SA−SB)/SC], thereby producing the fine information SF to obtain the position information. The level SC is constant regardless of the amount of difference (SA−SB). Unlike the prior art, linearity is not degraded by the normalization process. In addition, the sensitivity of the fine information SF in the vicinity of $\pm\frac{1}{2}$ Tp does not become 0.

The reproduction output of the area 35C may be utilized in other applications besides normalization. As one of such applications, the reproduction signal of the area 35C may be used for detecting the last position of the servo zone. In this case, the signal which is recorded in the area 35C is modulated in the same manner as the addresses which are recorded in the address areas 33 and 34. For example, when an address representing the track number is FM modulated at 2 MBPS and 4 MBPS and when an address where all bits are "1" has not been defined, the signal where all bits are "1" namely a 2 MBPS pulse signal, is recorded in the area 35C. The decoded address output indicates that the area 35C has been reproduced. This detection allows the last position of the servo zone to be detected.

In addition, the beginning of the servo zone can be detected with the reproduction signal of the servo header 31. Thus, when a window pulse for predicting the end position of the servo zone is generated with for example the clock in synchronization with the reproduction signal and with the detection signal of the servo header 31, the reproduction signal of the area 35C obtained in the width of the window pulse can be obtained as the end position signal of the servo zone. Since the detection signals at the beginning and end positions of the servo zone are obtained, the presence of the servo zone can be verified.

In addition, the reproduction signal of the area 35C can be used to provide AGC for use in controlling signal reproduction. In the data area where the digital data is reproduced, the AGC operation is executed by using this reproduction signal. In the servo zone, the AGC operation is executed based on the AGC signal, which is generated by detecting the reproduction output from the area 35C. By switching the AGC control signal in accordance with the above mentioned detection of the servo zone, AGC may be employed even in the servo zone. AGC in the servo zone is effective for reproducing the address signal.

e. Forming address information

Figure 7A:
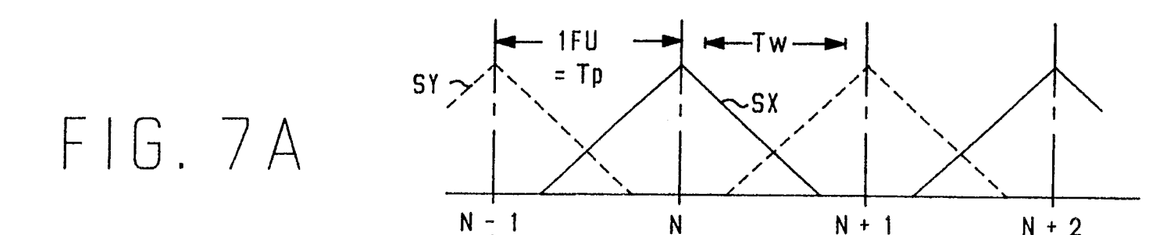
FIGS. 7A—7C are diagrams used in describing the formation of address information.

Now, the formation of address information using the reproduction outputs of the level detection areas 32X and 32Y and the address areas 33 and 34 will be described. Assume that the levels of the reproduction outputs of the areas 32X and 32Y are SX and SY, respectively. When the track width Tw of the magnetic head 3 is ¾ times the track pitch, as shown in FIG. 7A, triangularly shaped levels SX and SY are obtained as the positions change.

Figure 7B:
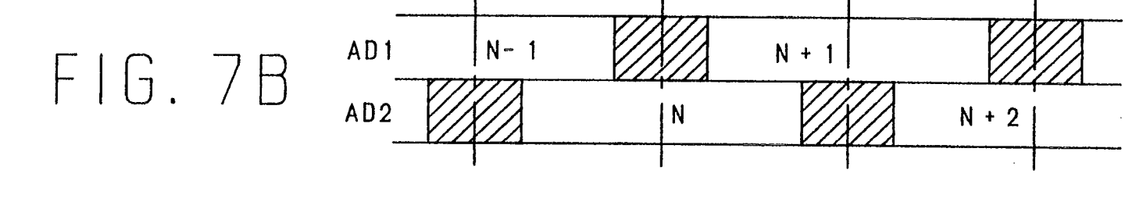

When the range of the above mentioned information SF is FU (in this example, 1 FU=Tp), the values of the addresses AD1 and AD2, which are recorded in the address areas 33 and 34, respectively, are changed by "2" at intervals of 2 FU's, as shown in FIG. 7B, the addresses AD1 and AD2 having a phase difference of 1 FU. In FIG. 7B, hatched areas represents ranges where the addresses AD1 and AD2 become undefinable. When the address AD1 and the adjoining portion are reproduced at the same time, for example, when the magnetic head 3 scans the position represented by H2 in FIG. 5, the address AD1 becomes undefinable. Likewise, a situation where the address AD2 becomes undefinable may take place. However, since there is a phase difference of 1 FU in the ranges where the addresses AD1 and AD2 become undefinable, two addresses do not become undefinable at the same time. In other words, at all positions, one of addresses AD1 and AD2 can be read. This condition is expressed as (1 FU−WE>0) where the width of the hatched area is WE.

In the hold circuits 13 and 14 shown in FIG. 1, addresses being held are updated at intervals of 2 FU's and thereby the addresses AD1 and AD2 shown in FIG. 7B are obtained. The addresses AD1 and AD2 and SX and SY from the A/D converter 8 are sent to the position calculation block 21 of the drive controller 9. The position calculation block 21 compares the level SX with the level SY and selects one of the addresses AD1 and AD2 responsive to the comparison. The selected address is used as the address information.

As shown in FIG. 5, the center of the address AD1 is matched with the center of the level detection area 32Y; and the center of the address AD2 is matched with the center of the level detection area 32X. As shown in FIGS. 5, 7A, and 7B, in the relationship of (SX<SY), the address AD1 is selected, while in the relationship of (SX>SY), the address AD2 is selected. In the relationship of (SX=SY), one of the address AD1 and AD2 is selected. By using the obtained address, address information N−1, N, N+1, ..., and so forth, which continuously vary, are decoded. Thus, at all positions of the magnetic disk, the address information can be obtained. By adding the address information and the fine information SP, the position information can be obtained.

Figure 7C:
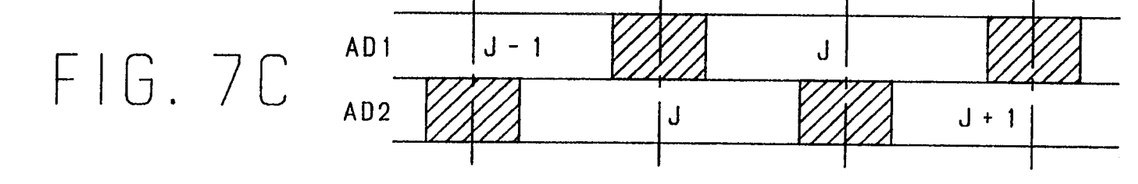

As shown in FIG. 7B, when addresses which change at intervals of 2 FU's are used, address information consisting of 256 addresses requires that both AD1 and AD2 have eight bits. However, since it is already known that the value of AD1 is odd and the value of AD2 is even, the number of bits required can be reduced by one bit. In other words, as shown in FIG. 7C, the addresses AD1 and AD2 which vary by "1" at intervals of 2 FU's are recorded in the address areas 33 and 34, respectively. N shown in FIG. 5B and J shown in FIG. 7C have the relationship of (J=½ N).

As was described above, one of the addresses AD1 and AD2 is selected depending on whether or not the level of SX is larger than that of SY. When the address AD2 is selected, (2×AD2) becomes the address information. In contrast, when the address AD1 is selected, (2×AD1+1) becomes the address information. For example, when AD2 is selected having a value J, the address information is decoded in accordance with (2×J=2×½ N=N). When AD1 is selected having the value J−1, the address information is decoded in accordance with (2×(J−1)+1=2×(½ N−1)+1=N−1). Thus, the number of bits of the address data recorded in the address areas 33 and 34 can be reduced by 1 as compared to the number of bits employed in the method shown in FIG. 7B. When the number of address bits used in accordance with the method of FIG. 7C are the same as that of the addresses of FIG. 7B, an address space twice that of the above method can be expressed.

The address information can be disposed at each track on the magnetic disk. In addition, the address information can be repeatedly disposed at intervals of for example 511 tracks.

When the above mentioned fine information is generated, the polarity of the different component (SA−SB) is controlled by the polarity determination signal SW. When the position accuracy of the switching points of polarities is poor, the linearity of the fine information SF also becomes poor. Thus, it is advantageous to perform the polarity switching control using the signals reproduced from the level detection areas 32X and 32Y.

As shown in FIG. 5, since the difference in position between the areas 32X and 35A and that between the areas 32Y and 35B are precisely set to ½ Tp, the point where SX=SY accords with the peak point of the levels of SA and SB which vary. Thus, at the point where SX=SY, the polarity can be switched. In addition, since the point where the address information is updated is (SX=SY), the address information is updated at the same position where the polarity is changed. Thus, the position information obtained by adding the address information and the fine information continuously varies.

According to the present invention, a speed profile for controlling the speed of a magnetic head which is moved in the vicinity of a target track is divided into a plurality of ranges, a speed y in at least one range being calculated with an approximation expression. Thus, the required memory capacity can be reduced in comparison with a method which stores all speed profile data in memory.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A method for controlling a speed at which a head of a disk drive apparatus moves toward a target track of a plurality of tracks disposed on a disk shaped recording medium, comprising the steps of:

reproducing a signal recorded on said disk shaped recording medium and detecting a current position of the head based upon the reproduced signal;

determining a distance between the current position of the head and a position of the target track;

producing a detection signal indicating a respective one of a plurality of predetermined distance ranges in which a distance of the head to said target track is located;

outputting at least one of a plurality of coefficients corresponding with one of said plurality of ranges from a coefficient memory storing said plurality of coefficients in accordance with a respective distance range indicated by the detection signal;

providing a speed profile for the respective distance range indicated by the detection signal as an approximation of an ideal speed profile for the respective distance range by calculating said speed profile in accordance with the distance between the current position of the head and the target track and at least one coefficient output from the coefficient memory; and controlling a speed of the head toward the target track in accordance with said speed profile.

2. A disk drive for moving a head to a target track of a plurality of tracks disposed on a disk shaped recording medium and for recording and reproducing data to and from the target track, comprising:

head position detection means for reproducing a track information signal recorded on said disk shaped recording medium to detect a position of the head;

distance determination means for determining a distance between a position of the target track and the head position determined by said head position detection means to obtain a distance signal;

range detection means for producing a detection signal indicating a respective one of a plurality of predetermined distance ranges in which the distance of the head to the target track obtained by said distance determination means is located;

calculation means for generating a speed profile for the respective distance range indicated by the detection signal produced by said range detection means by calculating said speed profile in accordance with the distance signal and at least one coefficient to determine said speed profile as an approximation of an ideal speed profile for the respective distance range;

a coefficient memory for storing and holding a plurality of coefficients corresponding with ones of said plurality of ranges and for outputting said at least one coefficient to said calculation means in accordance with the respective distance range indicated by the detection signal produced by said range detection means; and head moving means for moving the head toward the target track in accordance with the speed profile generated by said calculation means.

3. The disk drive as set forth in claim 2, further comprising a speed profile memory for storing speed profile information in at least one range of said plurality of ranges, said at least one range including a range closest to the target track, the head moving means being operative to move the head toward the target track in accordance with one of the speed profile calculated by said calculation means and the speed profile stored by said speed profile memory selected as a function of the respective distance range indicated by the detection signal.

4. The disk drive as set forth in claim 2, wherein each of said plurality of predetermined distance ranges extends for a corresponding distance interval proportional to a respective distance thereof said target track.

* * * * *